United States Patent [19]

Sizemore et al.

[11] Patent Number: 5,775,580
[45] Date of Patent: Jul. 7, 1998

[54] EVAPORATIVE COOLING SYSTEM

[76] Inventors: Timothy J. Sizemore, 2064 Silverfield Loop, Redding, Calif. 96002; Bryan L. Redd, 6325 Borg Cir., Odgen, Utah 84403

[21] Appl. No.: 700,633

[22] Filed: Aug. 16, 1996

Related U.S. Application Data

[63] Continuation-in-part of Ser. No. 504,509, Jul. 20, 1995, Pat. No. 5,695,117.

[51] Int. Cl.$^6$ ................................ B01F 3/02; F25B 49/00
[52] U.S. Cl. .................. 236/44 E; 62/176.4; 73/335.05; 165/222
[58] Field of Search ................. 236/44 E, 44 B; 62/176, 4, 171; 165/222; 73/335.05, 335.02; 261/DIG. 34

[56] References Cited

U.S. PATENT DOCUMENTS 1,950,344  3/1934  Williams ........................ 62/176.4
4,968,457  11/1990  Welch ........................... 62/171 X

*Primary Examiner*—William E. Wayner
*Attorney, Agent, or Firm*—A. Ray Osburn

[57] ABSTRACT

An evaporative device for cooling a stream of air for cooling a space into which the air is discharged. The device includes psychrometric sensors installed in the air stream at an evaporation pad which provide signals to a control device. The stream of air is cooled by one or more mist nozzles in the incoming air stream, the flow of water to which is controlled through analog or digital control devices, enabling cooling of the stream of air to the maximum permitted by psychrometric relationships without unnecessarily high humidity or overwetting of the evaporative pad.

18 Claims, 14 Drawing Sheets

EVAPORATIVE COOLING SYSTEM

RELATED APPLICATIONS

This Application is a continuation-in-part of application, Ser. No. 08/504,509, now U.S. Pat. No. 5,695,117 filed Jul. 20, 1995, having the same inventors, entitled EVAPORATIVE COOLING SYSTEM.

BACKGROUND OF THE INVENTION

1. Field

The field of the invention is evaporative air coolers, particularly such coolers that are relatively small but capable of efficiently cooling large volumes of air and are also capable of efficiently cooling warm air in the higher ranges of relative humidity.

2. State of the Art

The principle of evaporative cooling of low humidity air has been exploited for several decades in the drier regions of the United States and other countries. Present evaporative cooling devices typically comprise a low pressure, high volume air mover, such as a squirrel cage fan, mounted within a housing which incorporates large highly porous evaporation pads arranged vertically in its walls. Typically, the evaporation pads are in area four to six times the area of the duct directing the cooled air into the space to be cooled. Loosely woven fibers in the pad are wetted to provide a large surface of water for cooling evaporation. The fan is adapted for delivery of air in high volume and low pressure and the pads are accordingly thin in thickness while extensive in area. The required large pad areas result in impractically large coolers for many applications, such as automobiles, boat cabins, and mobile trailers where the interior space is limited and external mounting of the cooler is not desirable.

So far as is known, all prior art evaporative coolers utilizing evaporation pads require recirculation of unevaporated cooling water from a reservoir upwardly through a pump into an elongate water distribution main positioned along and above the upper edge of each pad. Examples of prior art evaporative coolers working on the above principles are found in U.S. Pat. Nos. 2,497,947 and 4,204,409. U.S. Pat. No. 4,953,831 discloses a variation, in that the incoming air is directed to flow along a passage bordered by the pad rather than directly through it. This increases the saturation of the air before discharge into the space to be cooled. The standard recirculating water approach for wetting the pad is retained, as is the pad construction. This approach increases the dwell time of the incoming air in contact with the pad, which is relatively small, saving space. Another variation is disclosed in U.S. patent application Ser. No. 08/255/005 now U.S. Pat. No. 5,529,536. A porous flexible pad of plastic fibers is formed into an endless belt, which is powered and directed by rollers to dip into and out of a water reservoir for wetting. The recirculating system is eliminated, but the complication of additional motors and rollers is added. U.S. Pat. No. Re. 31,675 discloses an evaporation pad comprising a number of vertically mounted wicking portions with lower ends immersed in a water reservoir. The incoming air flows between the wetted wicking members. While most evaporative coolers can be somewhat controlled by varying air flow or by water shut off, the latter control cannot be used with the wicking approach.

One prior art embodiment, disclosed in U.S. Pat. No. 2,793,015 utilizes a spray nozzle to inject water from a reservoir into the incoming warm air. The spray may also wet a pad formed into vertical separated wafers, with the incoming air flowing between. A device disclosed in U.S. Pat. No. 2,342,841 discloses the concept of using spray nozzles to introduce water for evaporation. The device includes thermometers and humidistats in the area to be cooled, and a water supplying pump which may be shut off in response to undesirably high humidity in the space to be cooled. Reliance in both is again upon recirculation, which is however provided by the spraying nozzles rather than by pump and drip systems. As with other devices, avoiding excessive entrained droplets in the air stream can only be done by utilizing very low air velocities. Because of this requirement, none of the prior art devices can utilize the air moving fans or blowers of the structure to be cooled. One possible exception is a device disclosed for vehicular application in the aforementioned co-pending application.

One system reportedly uses instead of a float value the change in electrical resistance of a carbonaceous grid installed in an evaporative pad as a signal to control a drip wetting system. Control is imprecise, and a tank for recirculation continues to be used.

A need exists for an efficient evaporative cooling device which can be compactly designed to smaller sizes than presently available, which prevents excessive wetness of the cooled stream of air, which extracts the full cooling potential of the water, and which may be designed to utilize the air movers and air handling ducting of the structure to be cooled.

BRIEF SUMMARY OF THE INVENTION

With the foregoing in mind, the present invention eliminates or substantially alleviates the disadvantages and shortcomings in the prior art devices based on cooling by evaporation. The inventive device utilizes the latent heat of evaporation of water which is introduced into a stream of air desired to be cooled. The flow of the water into the air stream is provided by appropriate valving or pumping devices commanded to operate by analog or digital logic control devices, which process signals from psychrometric sensors installed in the air stream.

In the analog system, sensors are provided having electrical resistances which vary with relative humidity. The resistance output is substantially proportional to the relative humidity over a range of the latter from approximately 80 to 100%. Based upon voltage signals corresponding to the sensor resistances, analog control logic commands the supply of cooling water to the cooling system be continued when the relative humidity is below approximately 95%, or interrupted if above approximately 100%. This is accomplished through control of a relay controlling water injection durations as required to maintain the maximum relative humidity to the desired value of 100%. (Maximum cooling in this example.)

This control function may, if desired, be effected digitally by use of a microprocessor, which is input with signals corresponding to downstream relative humidity, and downstream and upstream temperatures, all derived from appropriate sensors in the air stream. The microprocessor is provided with standard psychrometric data, and with logic for comparing sensor input therewith, thus determining the need or lack of need for injection of water into the air being cooled, and commanding the introduction or withholding of water accordingly.

The water is preferably injected into the air stream as finely divided spray or mist, using appropriate nozzles supplied with a flow of pressurized water. Preferably, the nozzles produce droplet sizes of the coolant water that are small enough to cause substantial portions, ideally all, of the water to evaporate directly into the stream of air, effecting immediate cooling in accordance with psychrometric relationships. However, since such ideal mist cannot in practice be produced, nor distributed uniformly in the air stream, an evaporation pad of water absorbent material is interposed across the stream of air downstream of the mist nozzles. The pad is preferably designed to substantially prevent the passage of any water in unevaporated droplet form, while allowing substantially unimpeded air flow.

Pads of conventional cellulose fiber mat construction may be used, if provided in sufficient thickness and density to have sufficient fiber surface to efficiently collect such droplets. The water of the droplets subsequently enter the air stream in vapor form by evaporation. Another pad construction comprises successive layers of spaced apart thin members of water absorbent material. Successive downstream layers are placed to block openings between the members of the preceding upstream layer. The successive layers provide diversion of all of the air stream, so that substantially all unevaporated droplets are deposited.

Advantageously, a layer of matted metallic filaments is provided abutting the downstream side of the absorbent pad, whatever pad construction is used. This acts to thoroughly mix the absorbent pad effluent air into a stream of uniform temperature and humidity. Fewer downstream sensors are then needed to provide data to the control units which are representative of the entire air stream. The conductive metallic fibers of the pad additionally promote and accelerate exchange of heat between the pad and air stream and between portions of the absorbent pad effluent air stream which may be at different temperatures. Preferably, this pad has a multiplicity of conductive rods or fingers extending upstream to other portions of the pad assembly which may be cooler.

With either analog or digital control, the flow of cooling water is always interrupted when the sensors indicate near approach to 100% relative humidity, or to a lower selected value. This prevents oversaturation of the cooling pad, and also allows less cooling water to be introduced into the air stream, so that both maximum and lower set point levels of cooling may be chosen, which is not possible with prior art evaporative coolers.

The controlled introduction of water prevents overwetting of the pad and eliminates the need for gravity drainage provisions, overflow reservoirs and recirculation pumps. The air ducts and evaporative pads may be positioned without respect to gravity. Because the air velocity through the cooling pad is substantially the same as in the outlet ducts, cooling pads are reduced in size over corresponding prior art systems, so that the inventive system requires much less installation space. Using smaller components and no water stored in the reservoir eliminates much of the inefficient heat sink of prior art designs. Because the unit is smaller, it is also more easily insulated to further reduce heat loss.

In the analog system discussed above, the relative humidity sensor is positioned downstream far enough to sense the relative humidity of the conditioned stream of air un-influenced by local variations across the air stream, as it would be if located too close to the outlet of the pad. If the sensor is too close, the stream is not at that location fully mixed, so that variations in relative humidity exist across the duct resulting in spurious sensor output. This in turn may lead to unwanted commands as, for example, to stop the introduction of water spray when the actual humidity downstream would indicate that additional water was needed. The opposite, vise versa, situation could also occur.

However, the more distantly downstream the sensor is placed from the pad, the greater is the discrepancy between sensed data and conditions within the pad itself, because of associated time lag, stream boundary conditions, heat loss or gain and the like. This may be a serious consideration, since overwetting or underwetting of the pad may be erroneously indicated. One important objective of the invention is the freedom to orient the pad without regard to gravity, in horizontal, vertical and in-between positions without pad dripping from overwetting. Further, accurate set point humidification or cooling may be seriously impaired. The feedback loop can never precisely indicate the need for wetting or withholding wetting of the pad.

Many of these disadvantages of downstream sensor location are eliminated by sensing the control condition at the point of water introduction to the stream. That is, directly within the pad or at its downstream face.

With this method of control, the system becomes a feed-forward rather than a feedback system. In other words, the stream of air is conditioned at the pad by addition or withholding of moisture for evaporation. Although the expected use of the conditioned air stream is considered in the design, no operating control is based upon any measured downstream condition.

With this feedforward control, the system may be used to attain a set point value of relative humidity of the stream of air within the pad, using only a single relative humidity sensor. The several parameters effecting the condition of the incoming air (including velocity, water vapor content, temperature, density, etc.) are subsumed into the sensed relative humidity, upon which the system control is based. This is not to say that the unsensed parameters are unimportant to design and operation of the system. They are in fact very important. The velocity of the stream, stream temperature, and stream vapor content, for example, all influence the rate at which water can be vaporized by the stream to alter its relative humidity. This in turn dictates the design, control and operation of the water introduction components.

Although it has been previously indicated that 100% relative humidity is the limit of the air conditioner 10, most efficient cooling in fact occurs when the moisture content of the stream is beyond the dew point into the condensation range. It is in fact possible to control the system within the condensation range while objectionable overwetting of the pad to a dripping condition is avoided. For this, it is necessary to sense not only relative humidity to 100% but also the level of condensation beyond. While separate, perhaps differently designed, sensors may be used in the two situations, it is very advantageous to employ a single sensor operable in and for both. As explained in more detail in the following Detailed Description, the need to control within the condensation range arises from practical considerations, and no assertion is made that super-saturated air is cooler than air at 100% relative humidity. However, utilization of pad moisture into the condensation range is a very effective method of evaporative cooling of high velocity air streams.

Other characteristics and advantages of the inventive evaporative cooling system are evident in the following detailed description.

BRIEF DESCRIPTION OF THE DRAWINGS

In the drawings, which represent the best modes currently contemplated for carrying out the invention.

DETAILED DESCRIPTION OF ILLUSTRATED EMBODIMENTS

Figure 1:
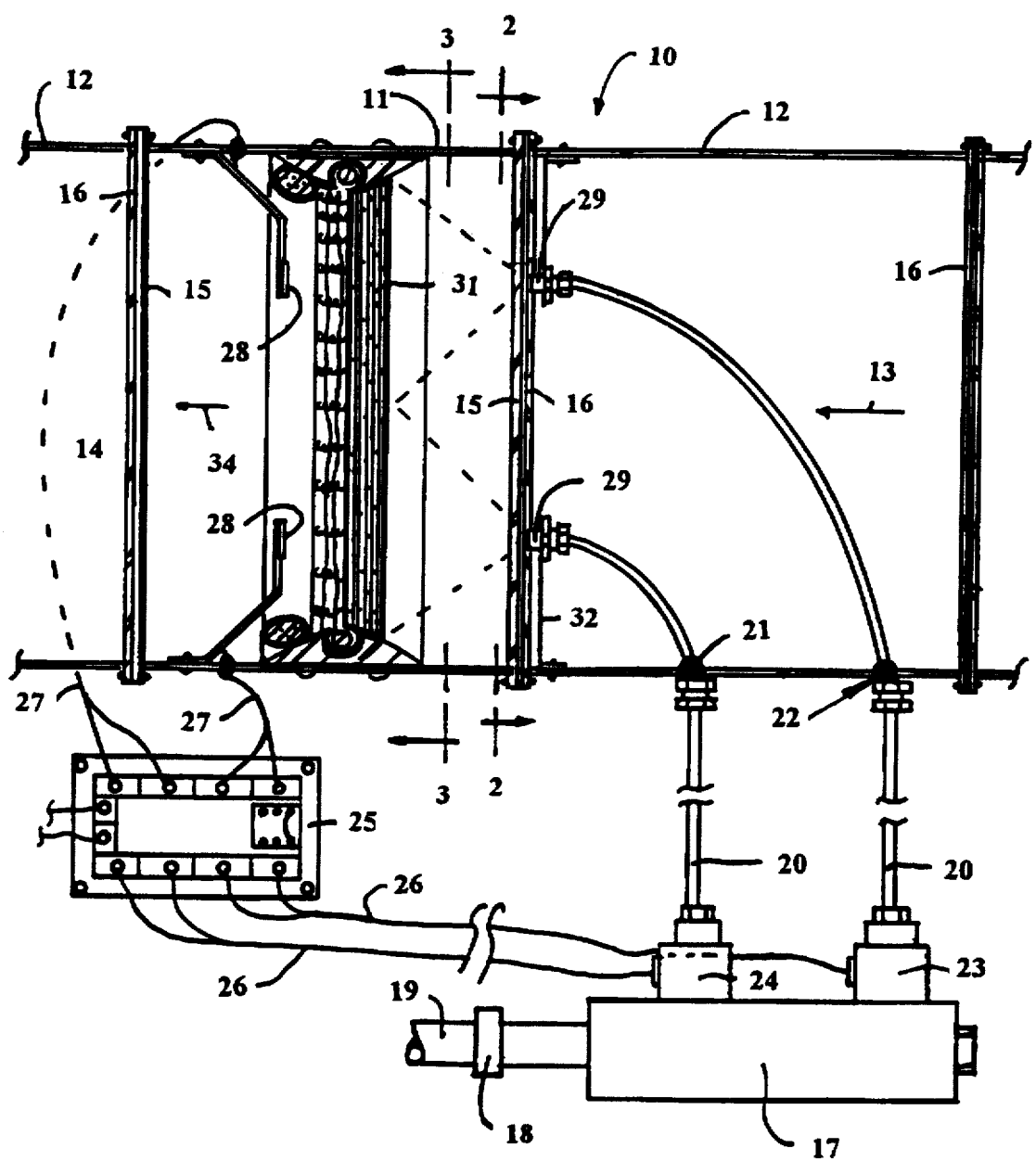
FIG. 1 is a vertical cross sectional view of an evaporative cooler in accordance with the invention, instrumented for analog logic control, and adapted to be installed within the air handling duct work of a structure the interior of which is to be cooled, drawn to a reduced scale, FIG. 2 a cross sectional view of the cooler installation of FIG. 1, taken along line 2—2 thereof, drawn to a slightly larger scale than FIG. 1, FIG. 3 a cross sectional view taken along line 3—3 of FIG. 1, drawn to the same scale as FIG. 2, FIG. 4 a cross sectional view of an evaporative cooler in accordance with the invention, adapted to be installed within the duct work of a building the interior of which is to be cooled, however instrumented for control using a microprocessor, drawn to the scale of FIG. 1, FIG. 5 a front elevation view of the head end of one of the mist nozzles of the invention, drawn to substantially full scale, FIG. 6 a front elevation view of the head end of one of the mist nozzles in accordance with the invention, having a rectangle rather than a circular mist forming orifice, drawn to the scale of FIG. 5, FIG. 7 a representation of the relationship between resistance, percent relative humidity and condensation level of a relative humidity sensors employed in the invention, FIG. 8 a fragment of the evaporative pad assembly of FIG. 4, drawn to substantially full scale, FIG. 9 a view of a fragment of a sheet of cellulose paper employed in the evaporative pad construction process, indicating the slits therethrough, drawn to substantially full scale, FIG. 10 a view of a fragment of a slitted cellulose sheet expanded to provide openings and deposition surfaces within the evaporation pad, drawn to substantially full scale.

An embodiment of the evaporative air cooler 10 in accordance with the invention is illustrated in FIG. 1 installed within a housing 11 sized to fit into an air handling duct 12 through which ambient air 13 enters a space 14. Housing 11 may be secured to duct 12 as by mating flanges 15 and 16. Duct 12 may be in some instances be installed to admit air into the structure. In others, existing air ducting for heating or air conditioning within the structure may be utilized. A water supply valve assembly 17 is connected through a water filter 18 to a water supply through an inlet water pipe 19. In other installations, water may be supplied through appropriate pumps, not shown. Valve assembly 17 delivers water to cooling unit 10 through flexible inlet tubing 20 of ¼" O.D. polyethylene tubing, for example, entering housing 11 via grommets 21, sealing perforations 22. Flow through the two water inlet tubes 20 is controlled by solenoid operated valves 23 and 24.

An analog control card 25, such as Model No. HCL-120 manufactured by Ohmic Instruments Company of Easton, Md., provides electrical energy through output leads 26 to operate the solenoids to allow or to prevent flow of water into cooling unit 10. Control card 25 incorporates analog circuitry which acts in response to data received through leads 27 from downstream relative humidity/condensation sensors 28, such as Model HCS also available from Ohmic Instruments.

Figure 2:
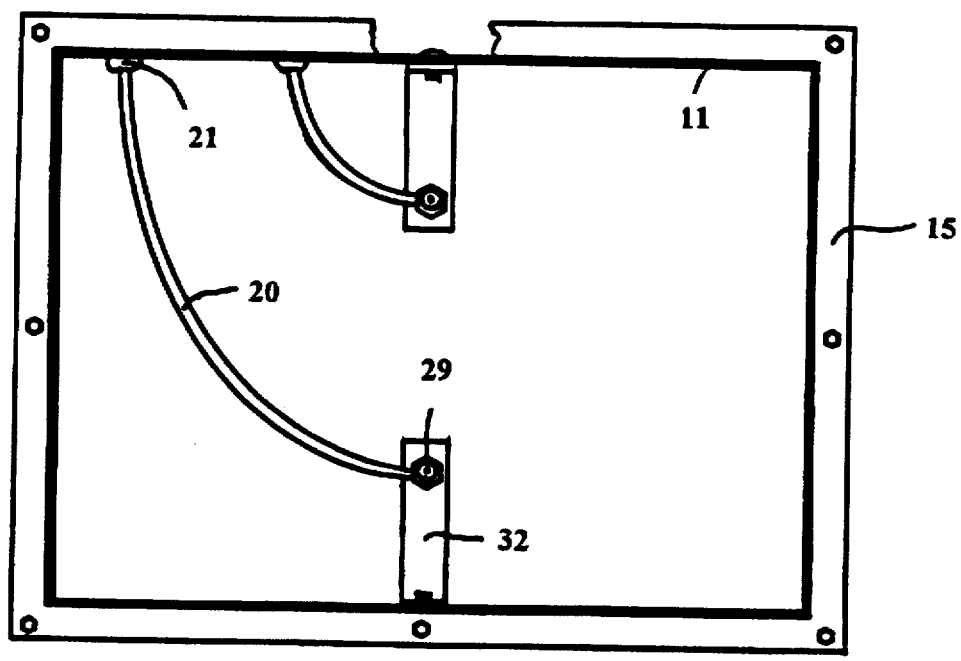
Figure 5:
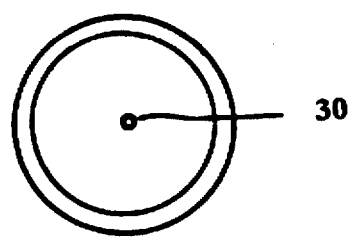
Figure 6:
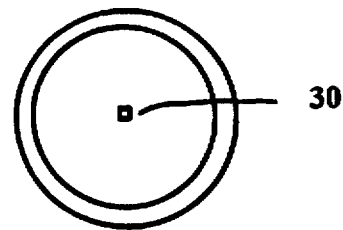

Inside housing 11 are mounted a pair of nozzles 29 for producing a finely divided mist of the water supplied through inlet tubes 20. (FIGS. 1 and 2) Nozzles 29 are situated so as to emit the mist in three dimensional conical patterns, distributed across housing duct 11. Nozzles 29 comprise an exit orifice 30 about 0.030 inches in diameter. Orifice 30 may however be shaped as needed to provide uniformly distributed mist impingement upon an evaporation pad 31, which is interposed across housing 11. (FIGS. 5 and 6) Mist nozzles 29 may be obtained from Bete Corporation of Greenfield, Mass. Brackets 32 support nozzles 29 from the walls of housing 11.

Figure 3:
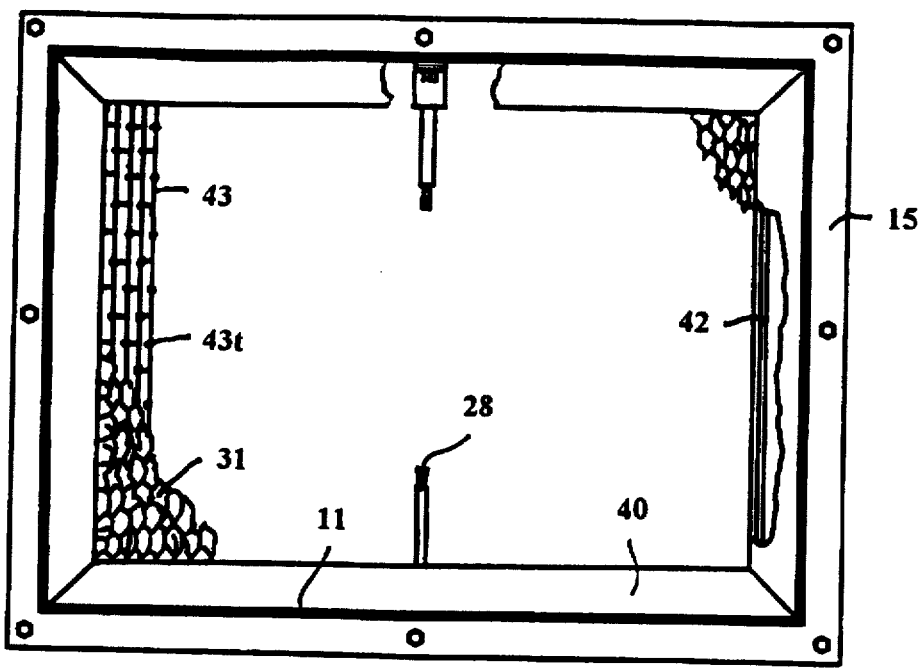
Figure 7:
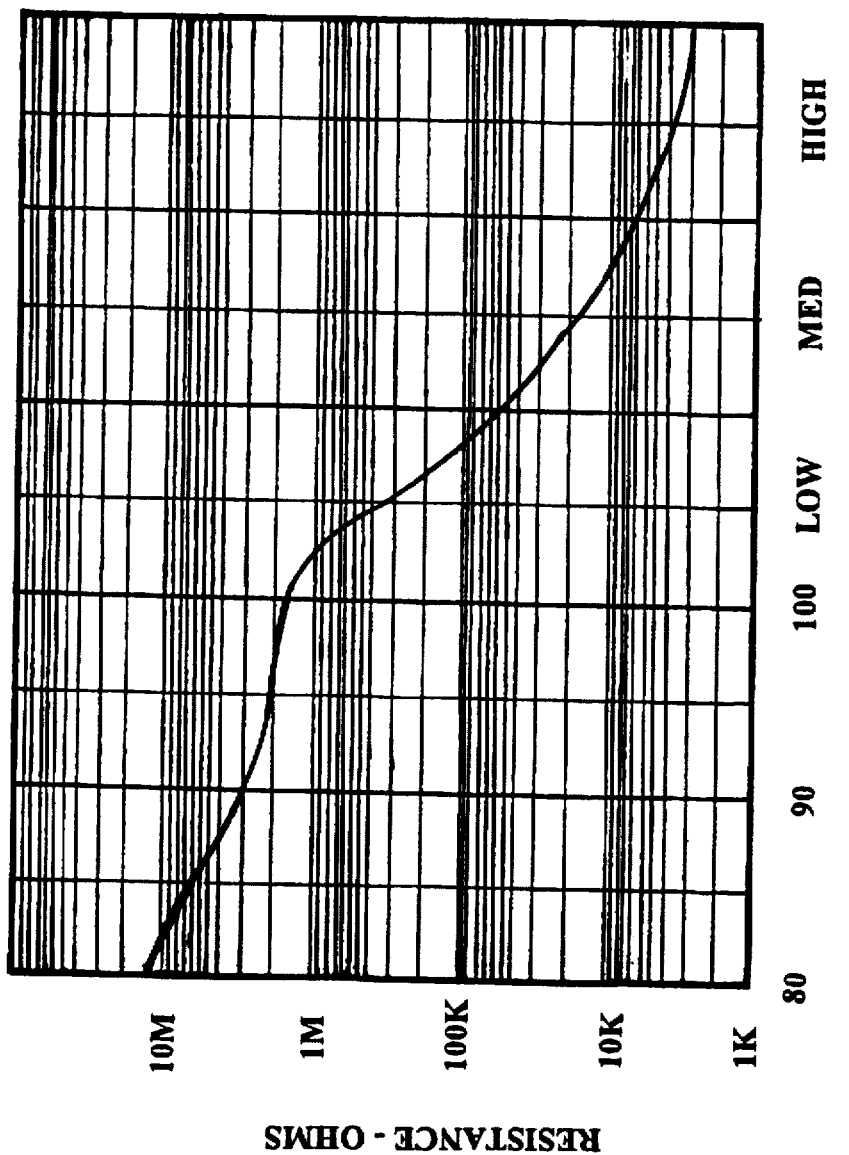

Sensors 28 (FIGS. 1 and 3) experience changes in electrical resistance with changes in relative humidity of the downstream cooled air. (FIG. 7) Condensation occurring upon sensors 28 above 100% relative humidity produces similar changes. However, the wetness of the air in the condensation range is generally undesirable for evaporative cooling, so that the condensation range is avoided for control of cooler 10. As subsequently discussed, care is taken to prevent any water droplets from penetrating pad 31 to impinge upon the sensors 28, to avoid spurious indications of relative humidity. Since maximum evaporative cooling occurs when 100% relative humidity is reached, the repeatability of the relationship between about 80% and 100% relative humidity enables the use of simple analog circuitry to control the injection of cooling water.

In operation, voltage signals corresponding to the electrical resistances of relative humidity sensors 28 are received by a control card 25 through electrical leads 27. The electrical resistances of sensors 28 vary inversely with the relative humidity of the air emerging from the downstream side of the evaporation pad 31, as discussed above. Higher relative humidity is associated with lower sensible temperatures. Control card 25 is designed to monitor the relative humidity as water is misted into the air stream until it increases to a desired value. Generally, 100% is desired, for maximum cooling. When this or any lower control relative humidity is reached, card 25 commands solenoid valves 23 and 24 to interrupt the flow of water through the mist nozzles 29. Subsequent drop in sensed relative humidity to about 95% causes resumption of cooling water flow by command from control card 25.

For successful accurate operation of relative humidity sensors 28, deposition thereon of liquid water droplets from the mist must be prevented. Such droplets are not from condensation, but may effect the output sensor in the same manner as actual condensation, causing spurious sensor output. The downstream air 34 must be substantially free of such droplets which in fact exist among the droplet distribution of the mist nozzles 29, and survive for significant periods even in air of low humidity.

Evaporation pad 31 may be of various constructions to preclude entry of such mist droplets into the downstream air 34. However, the selected construction must divert the incoming air to follow a torturous path. The entrained droplets, propelled by momentum, cannot negotiate the curving and bending air path, and are deposited within the pad. Immediate and rapid absorption of the impinged droplets assures that none survive. Subsequently, the water previously constituting the droplets evaporates directly into the continuing air stream 13 as a vapor.

Figure 8:
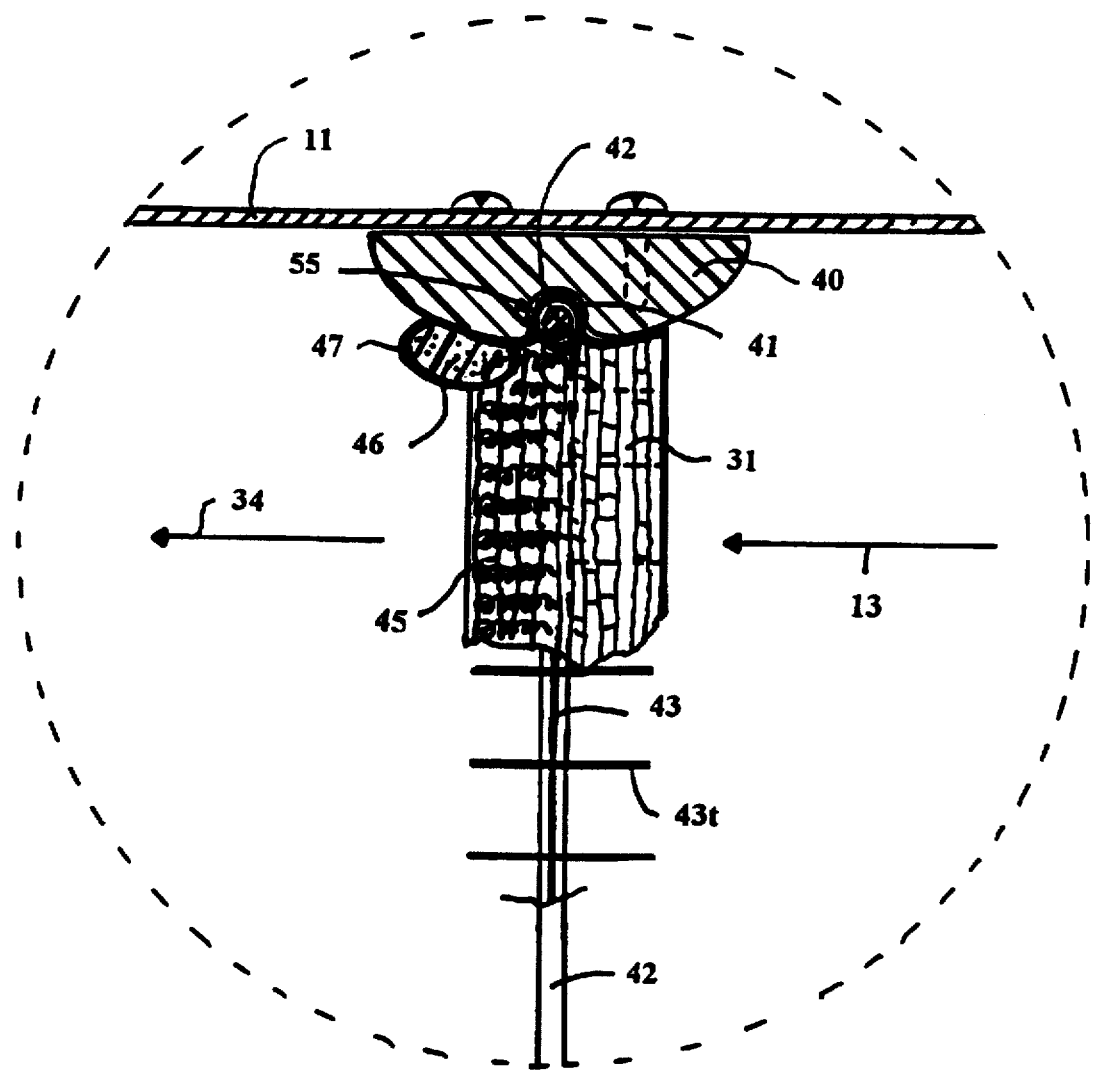
Figure 10:
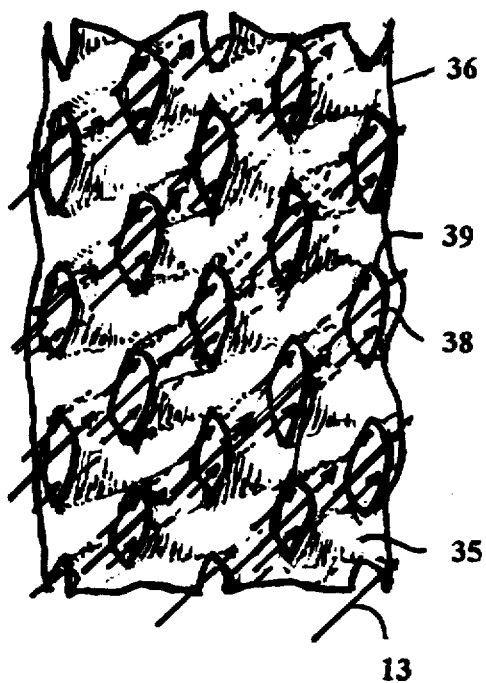
Figure 9:
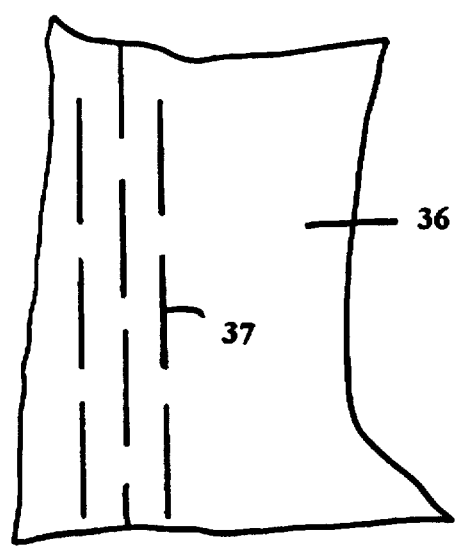

Evaporation pad 31 may be of alternate forms so long as the air flow is forced to change direction as discussed above. A presently preferred embodiment is illustrated in FIGS. 8–10. Sheets 36 of cellulose paper are provided with alternately staggered rows of slits 37 (FIG. 9), then stretched perpendicularly to the rows of slits. This opens the slits 37, providing openings 38 for air flow, and twisting the strips 39 between the slits to form the inclined droplet deposition surfaces. The edges of stretched sheets 36 are secured to a frame and seal 40, as by potting material 41, each sheet positioned with deposition surfaces 35 placed to span across openings 38 of the next preceding upstream stretched sheet 36. Sufficient successive sheets 36 are provided to completely block any air flow path directly through pad 31.

The sheets 36 may be further supported by one or more metallic open mesh sheets 43, secured to a heavy wire frame 42. Mesh sheets 43 support the sheets 36 against the pressure of incoming air 13, and against sagging from gravity in horizontal pad installations. An open mesh metallic member 43, also has a number of wire segments severed and bent to form supporting tines 43t. Heavy wire frame 42 snaps into groove 55 in frame 40 for primary pad support.

In addition to absorbent pad 31, it is advantageous to provide an abutting downstream layer 45 of metallic filament matting, also supported by open mesh 43, serving to more thoroughly mix and exchange heat to the emergent air. More uniform temperature also results from the conductivity of the metallic filaments. Both the mechanical mixing and heat exchange functions of mat 45 improve the uniformity of humidity and temperature of the stream flowing over the sensors 28, the output of which is accordingly more accurately indicative of the need to continue, interrupt, or commence injection of upstream water. Local variations of temperature humidity and velocity of the air across pad 31 result from local non-uniformities in pad construction, and in velocity and temperature across duct 12, as well as from variations in mist distribution. A peripheral absorbent felt member 46 contained within muslin mesh 47 is preferably provided around the filament pad 45 to prevent any edge accumulation of water from being entrained unevaporated into downstream air 34.

Figure 4:
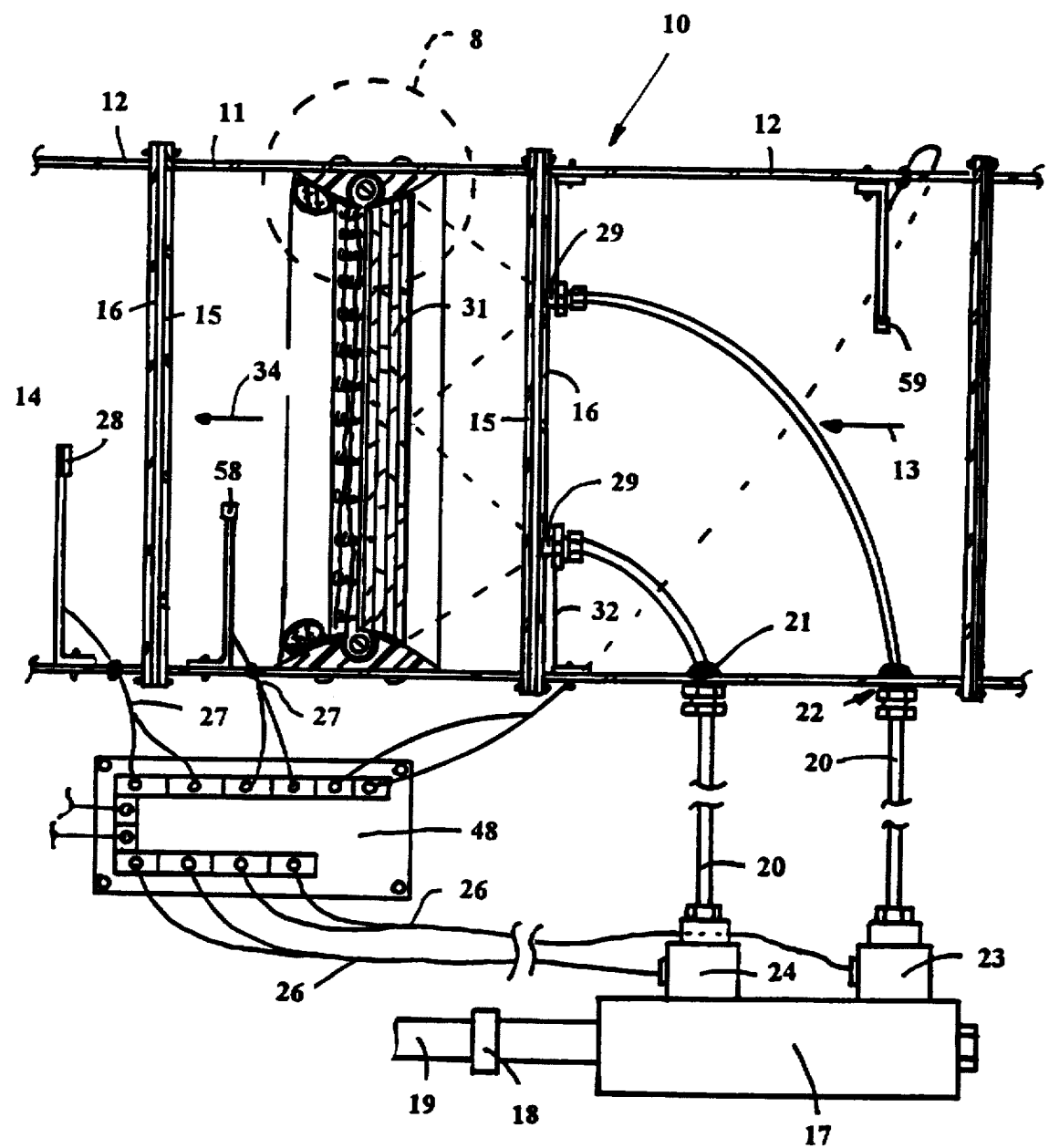

Evaporative cooling device 10 may be designed for digital, rather than analog, control. A microprocessor 48 is programmed to operate in response to the output from relative humidity sensors 28, a downstream air temperature sensor 58 and ambient or intake air temperature sensor 59 on the upstream side of mist nozzles 29. (FIG. 4) Microprocessor 48 has stored standard psychrometric data. The microprocessor logic in effect plots sensed downstream relative humidity and temperature upon a graph of standard psychrometric relationships between relative humidity, air pressure and air temperature, to determine whether a change in relative humidity would result in a decrease or an increase in downstream temperature. If increased relative humidity is needed to drive the downstream temperature towards a target level, microprocessor 48 commands the valves 23 and 24 to continue the flow of water to nozzles 29, for example.

Figure 13:
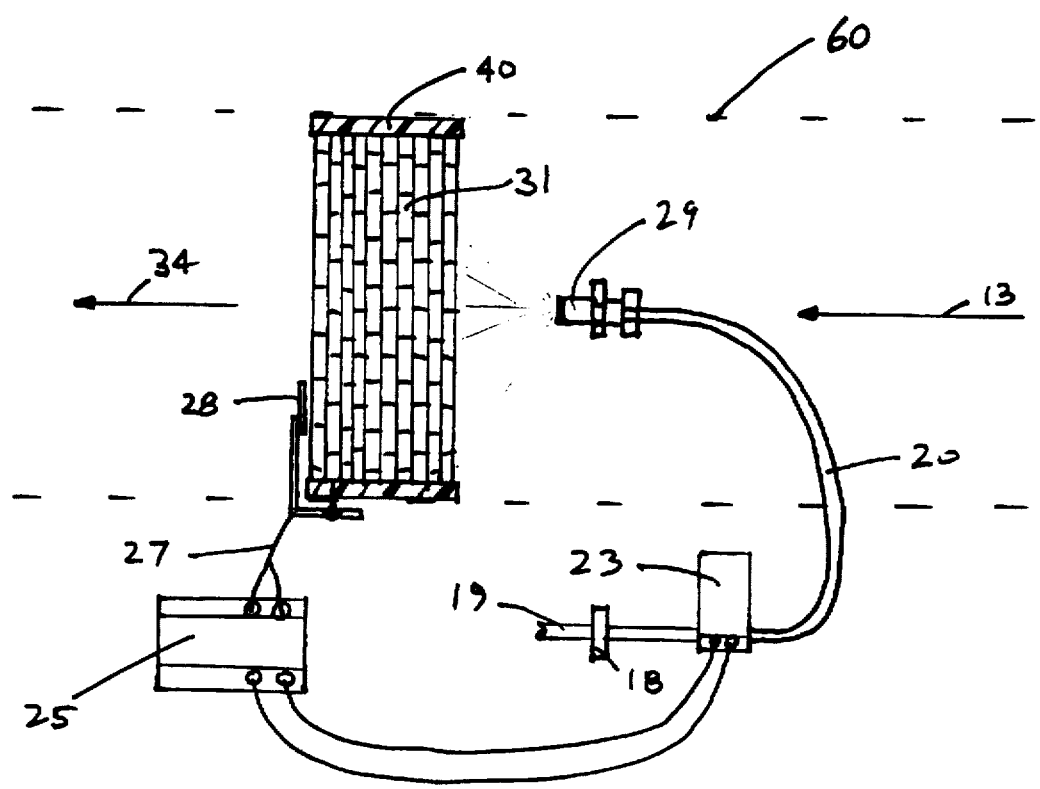
Figure 14:
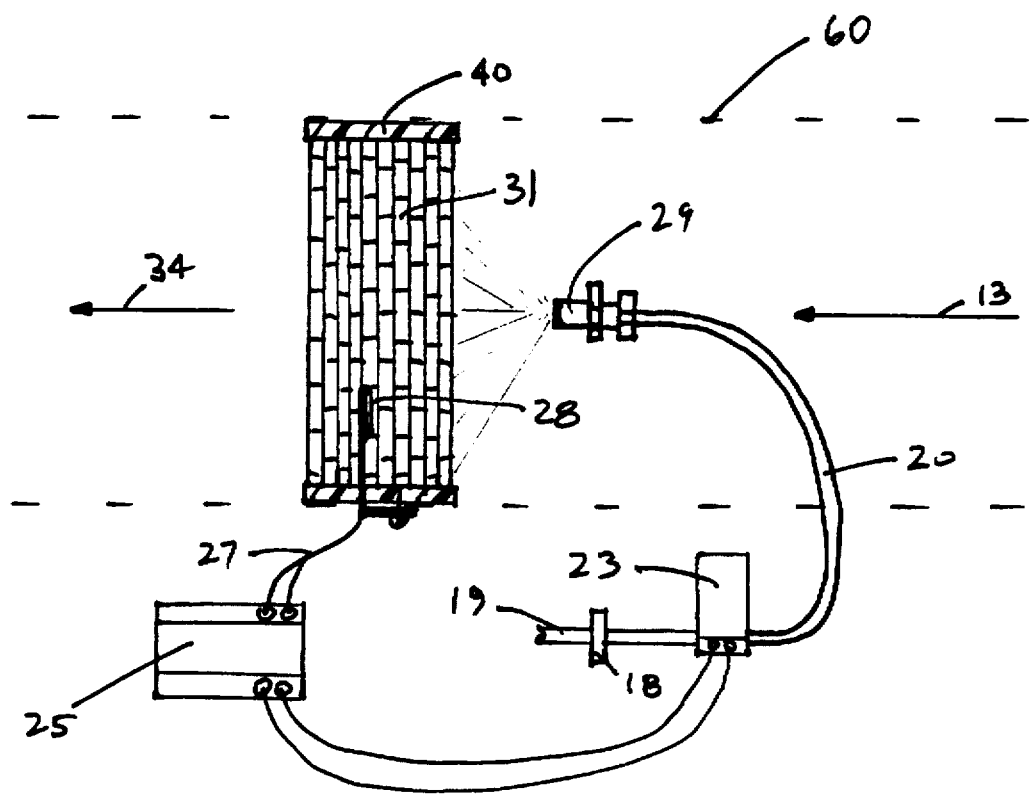
Figure 15:
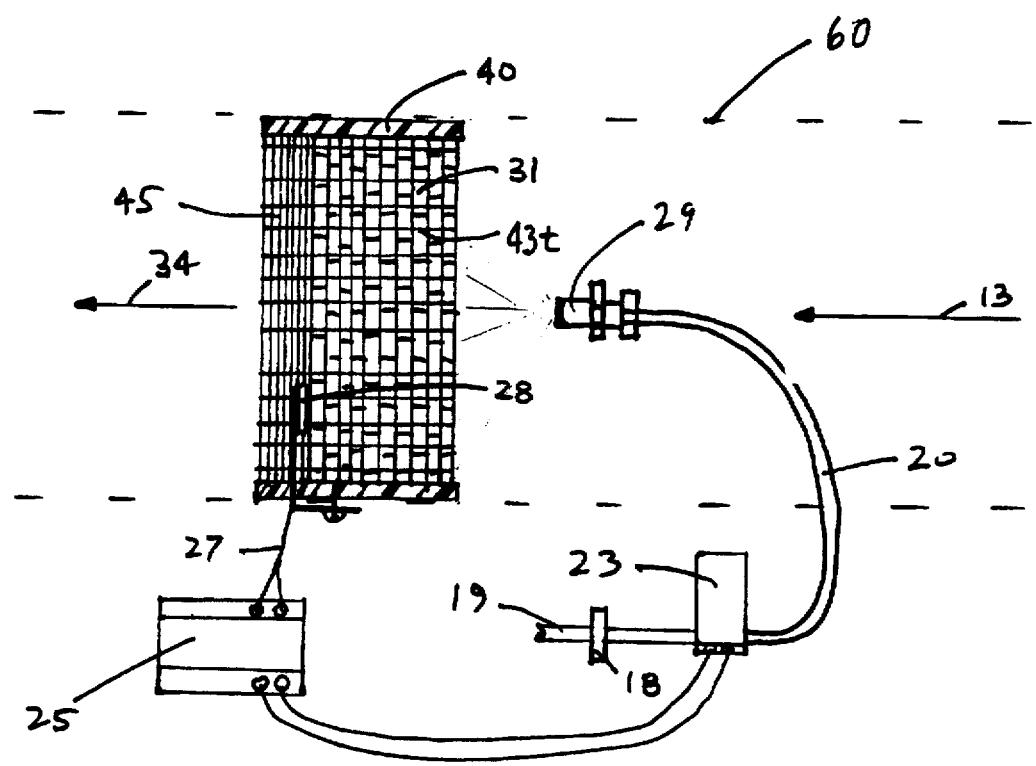
Figure 16:
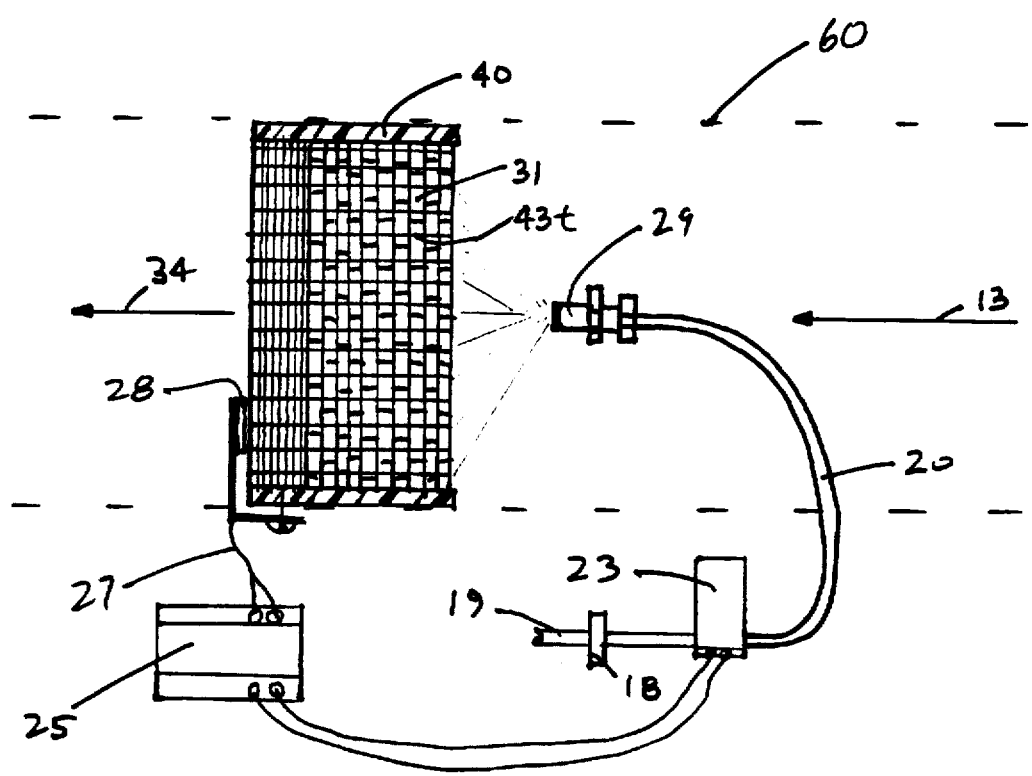
Figure 17:
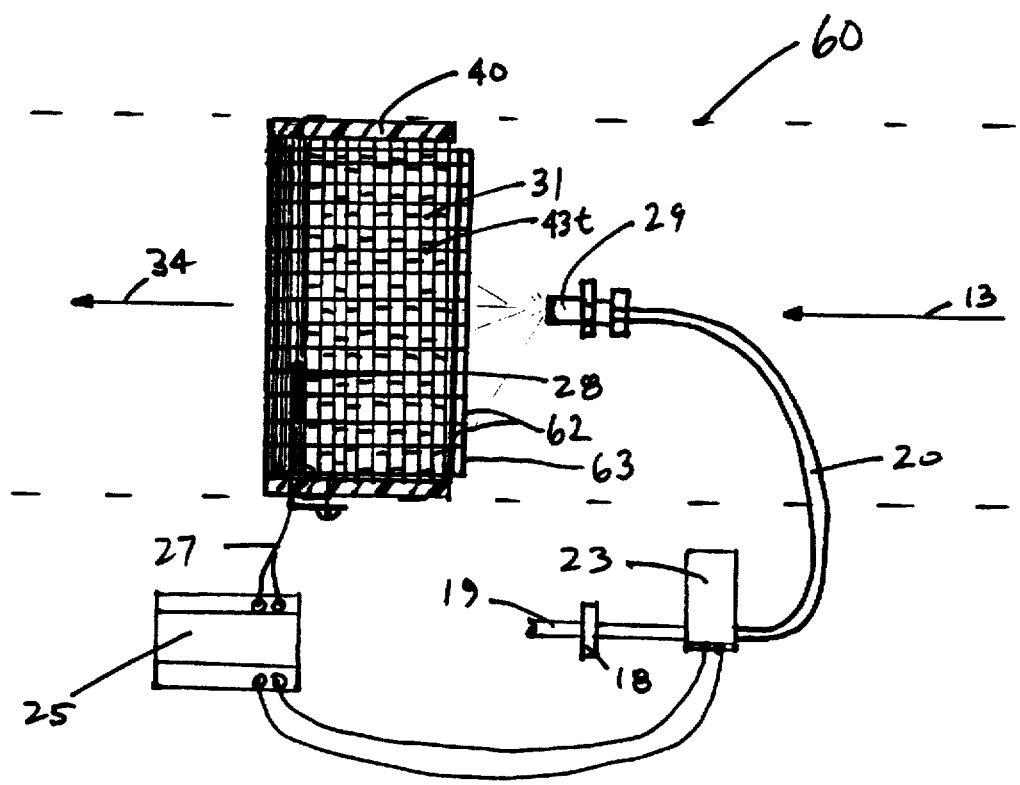

Alternative embodiments of the inventive evaporative cooler include embodiments with a single sensor for relative humidity located in such near vicinity to the pad as to read upon psychrometric conditions of the air within and across the pad. Thus, the sensor may be located at the downstream face of the pad (FIGS. 13, 15 and 17), or within the body of the pad itself. (FIG. 14) As indicated in these Figures, the air stream 34 actually passing through the pad is conditioned, regardless of the driving force. Thus, it may be directed by an inlet duct as shown in prior FIGS. 1 and 4 for example, or defined only by the shear boundary 60. (FIG. 13, e.g.) Analog or digital control may be used in such systems, as with the above described system having a sensor well downstream of the pad. With the above described construction of the pad, the sensor located within the pad is also shielded from deposition of droplets in the same manner described above. The same is true for sensor 28 when located at the downstream face of the pad. With either of these embodiments, the moisture content of the air within the pad may be monitored to both control cooling and to avoid overwetting the pad to a dripping condition. If the latter were allowed to happen, freedom to select the orientation of the pad would be severely restricted, as it is in state of the art evaporative cooling systems.

The objective of either of these embodiments is to provide a stream of conditioned air, for whatever use is desired downstream of the evaporation pad. However, the control is not downstream. There is no feedback control sensor in this system, as exists in other systems. (For example in a room or other space to be cooled.) Rather, conditions in the pad are controlled for whatever use might be made of the resulting stream of conditioned air.

The air conditioner 10 may be used for either humidification of the stream of air or for cooling. When used for humidification, the value of downstream relative humidity is generally well below 100%. The stream of air will be cooled to some extent, but not sufficiently to satisfy most cooling requirements. Although it is stated previously that the limit of control is generally 100% relative humidity because of difficulty with the sensor output, it is in fact very desirable for more effective cooling to control in the range of moisture content at the evaporation pad even above this value. That is, the conditioned air contains total moisture made up of sufficient water vapor for complete saturation and additional moisture in suspended droplet or mist form. However, if too much water is carried in this liquid suspended form, deposition upon the pad will be excessive and it may become dripping wet.

The need to base control of water introduction beyond the vapor saturation point of the air in the pad arises from practical exigencies, not because super saturated air is cooler. Water cannot be provided continuously at the precise rate to maintain the relative humidity at 100%, where maximum attainable cooling occurs. Rather, the water must be added by intermittent spray pulses, which permits the use of nozzle orifice of sufficient size to obviate plugging. To achieve continuous maximum cooling of the continuously flowing air stream then requires that it at times contain somewhat more moisture than required for maximum cooling. That is, the control point is in the condensation range, beyond the point of 100% relative humidity. The above described sensor responds predictably in this range, so that set point control may be utilized. The condensation range, labeled "Condensation Level" in FIG. 7, extends from 100% relative humidity to the moisture content accompanied by such profuse deposition of moisture upon the sensing element as to completely inundate it, coat it deeply in liquid water. Slightly beyond 100% relative humidity, the sensing element becomes thinly filmed with water at the dew point determined by psychrometric relationships occurring at the temperature of the air.

To control the amount of liquid moisture, a sensor is required which indicates the level of condensation of moisture from the stream when the moisture content is well beyond that for 100% relative humidity. Separate sensors may be provided for the ranges above and below 100% relative humidity. However, it is preferred that a single sensor be used, with repeatable response both above and below 100% relative humidity, such as the sensor described above, having the signal response depicted in FIG. 7, for example.

The evaporative air conditioning system 10 starkly contrasts with state of the art systems, in that pad total area is almost an order of magnitude smaller, and air velocity through the pad is almost an order of magnitude higher. The higher velocity permits very rapid cooling to dew point temperatures. In most installations, the velocity in fact equals or exceeds that of sling psychrometers. Since air moving at such velocities exerts considerable dynamic pressures, the pad must be strongly supported, as by the metal grid 43. (FIGS. 8)

The efficiency of the conditioner 10 is increased by addition of the downstream heat exchanger 45 discussed above, with conductive fingers 43t extending well into pad 31. (FIG. 8) The conditioned air immediately downstream of pad 31 is often of higher temperature than the material of the sheets of the pad, because of rapid "flash" evaporation from the sheet surfaces. This phenomena increases in magnitude with the velocity of the air stream up to and beyond the velocity of a wet and dry bulb sling psychrometer. Conduction of heat upstream through the fingers 43t aids in the evaporation occurring in the pad 31.

The efficiency of conditioner 10 may be still further increased by addition of an upstream surface evaporation layer 63 constructed with similar configuration to that of pad 31, however having only two sheets 62 of the material, which however is conductive (metallic or heat conducting plastic) and non-absorptive of water. (FIG. 17) The conditioning water is preferably sprayed upon the upstream face 63 of the layer 61, to be partially "flashed" into vapor, substantially cooling the conductive sheet of material. Fingers 43t in this embodiment extend from heat exchanger 45 through pad 31 and thence into the surface evaporation layer 61.

Figure 11:
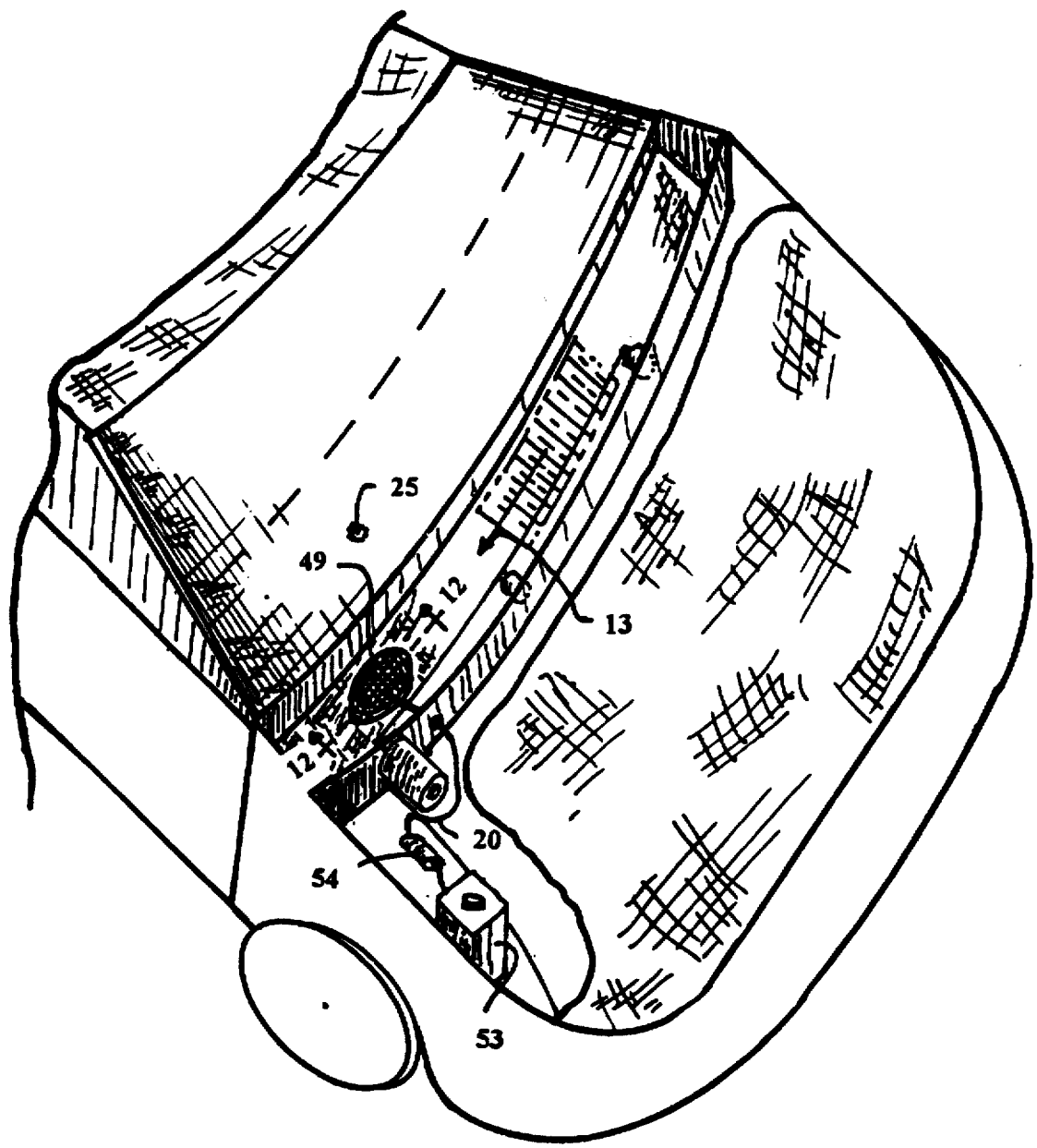
FIG. 11 a perspective view of a fragment of a motorized vehicle cut away to show the outside air inlet and indicating the vehicle carried blower and a water reservoir tank, drawn to a reduced scale, FIG. 12 a vertical cross sectional view of a vehicle evaporative cooler installation in accordance with the invention, showing the upstream mist nozzle, the evaporation pad structure and the downstream relative humidity sensor used to control the system by providing signals to an analog logic card, FIG. 13 a cross sectional representation of an evaporative cooler in accordance with the invention, comprising a wettable evaporation pad installed across a stream of air which may or may not be directed by a duct, having a single sensor placed at the outlet face of said pad, drawn to the approximate scale of FIG. 1, FIG. 14 the evaporative cooler of FIG. 13, the single sensor however being placed within the body of the evaporative pad, drawn to the same scale, FIG. 15 the evaporative cooler of FIG. 13, the pad however further comprising a downstream heat exchanging layer connected with the wettable pad by conductive members, drawn to the same scale, FIG. 16 the evaporative cooler of FIG. 15, the single sensor however being placed at the downstream face of the heat exchanging layer, drawn to the same scale, and FIG. 17 the evaporative cooler of FIG. 15, further comprising an upstream layer of water impervious sheet material.
Figure 12:
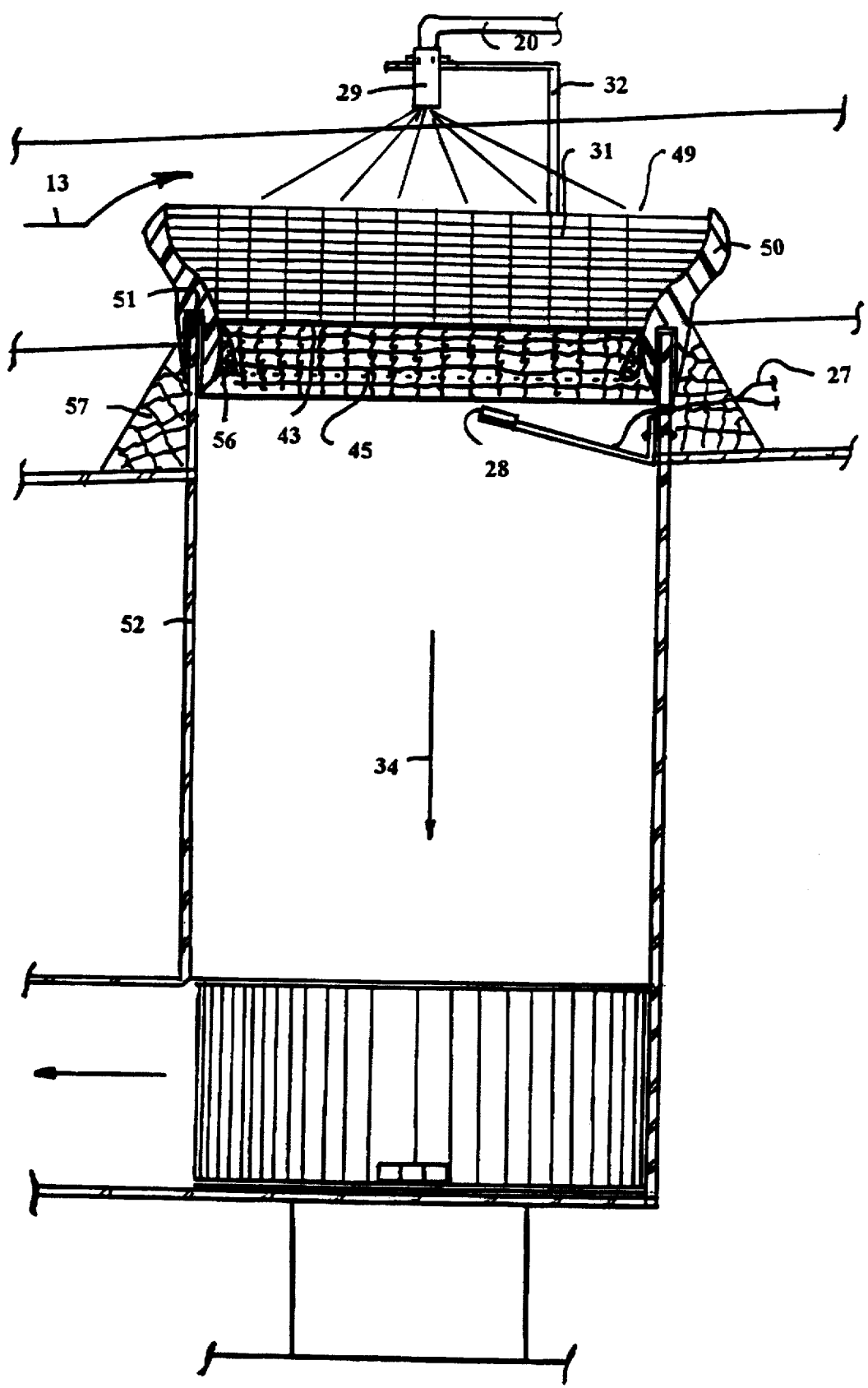

The same operational principles discussed above apply also to cooling units 10 for the interior of automobiles, trucks, trailers and boats. For automobile application an evaporative pad assembly 49 is installed, employing a preferably elastic seal 50 upon the outside air inlet 51 to the internal ducting 52 of the vehicle. (FIGS. 11 and 12) A water reservoir tank 53 supplies the mist nozzles 29 with water through a control pump 54. As with building systems 10, either analog or digital control (not illustrated for vehicular application) may be used. Pad 49 incorporates an absorbent layer 31 and a metallic filament layer 45, as discussed above. An edge drip collector 56 of felt is preferably provided, as is a plastic foam insulating collar 57 about air intake 51. A downstream relative humidity/condensation sensor 28 provides input to an analog control card 25 mounted in the vehicle passenger or driver compartment.

The inventive apparatus may be embodied in other specific forms, and the method in other specific steps, without departing from the spirit or essential characteristics of either. For example, other means than the mist nozzles could conceivably be employed to introduce water into the stream of air to be cooled, such as drip wetting or pad dipping methods and apparatus. Nor is the evaporative cooling installation necessarily adapted for cooling incoming air from outside a building structure or vehicle. Rather, recirculated air may also be processed, and the system can be controlled to serve as a humidifier for internal air, all based on the same principles of operation. The evaporative cooling device 10 may be used in conjunction with refrigerated air conventional central systems, providing pre-cooling or even alternate switching between cooling systems. The presently illustrated and discussed apparatus and method are therefore to be considered illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A method of evaporatively conditioning a moving stream of air to modulate the moisture content thereof to achieve target values of moisture content and temperature therewithin, comprising the steps:

embedding at least one sensor to be surrounded by an evaporation pad through which the air stream is moving, the output of said sensor being predictably related to the moisture content of the air as it moves through the evaporation pad;

continuously monitoring the sensor output;

continuously analyzing the monitored output to determine whether and at what rate to add water to the air stream entering the pad, to urge the moisture content to a target value selected from between a target value which is less than 100% relative humidity without dripping of water out of the pad, and a target value which is at or beyond the condensation point with minimal dripping of water out of the pad;

introducing water into the stream entering the pad in accordance with the continuing analyses.

2. The method of claim 1, wherein:

the evaporation pad is supported by a metallic wire mesh, so that said pad may be used with air stream velocities at least equal to that of sling psychrometers.

3. The method of claim 1, wherein:

the sensor output is related to relative humidity in the range to 100% in the air in the pad; and to condensation level of the air in the pad in a range of air moisture content greater than 100% relative humidity.

4. The method of claim 3, wherein the sensor output indicating relative humidity is provided by a sensor in the pad; and the sensor output indicating condensation level is provided by another sensor in the pad.

5. The method of claim 3, wherein:

the outputs indicating relative humidity and condensation level of the air in the pad are both provided by a single sensing element within a single sensor assembly.

6. The method of claim 5, wherein:

the water is introduced into the stream by wetting an air permeable, water droplet impermeable, evaporative pad placed across the stream of air, said pad having an upstream and a downstream face, and including;

at least one layer with an upstream and a downstream face being constructed of water absorbent sheet material, said layer having air passages therethrough defined by baffles of said sheet material upon which water droplets in the air stream impinge;

a layer of air permeable mesh of heat conducting members abutting the downstream face of the water absorbent sheet layer and itself having a downstream face, said mesh members being conductively connected to a multiplicity of heat conducting members extending upstream through the evaporative pad; and an upstream layer abutting the upstream face of the layer constructed of water absorbent sheet material, the upstream layer having an upstream face and being constructed of sheets of water impervious, heat conducting sheet material having air passages defined by baffles of said material upon which water droplets in the stream impinge; wherein the single sensor is placed at the downstream face of the layer of the heat conducting mesh; and the evaporative pad is wetted by spraying water upon the upstream face of the layer constructed of water impervious sheet material.

7. The method of claim 6, wherein:

the evaporation pad is supported by a metallic wire mesh, so that said pad may be used with air stream velocities at least equal to that of sling.

8. The method of claim 5, wherein:

the water is introduced into the stream by wetting an air permeable, water droplet impermeable, evaporation pad placed across the stream of air, said pad having an upstream and a downstream face, and including at least one layer with an upstream and a downstream face being constructed of water absorbent sheet material, said layer having air passages therethrough defined by baffles of said sheet material upon which water droplets in the air stream impinge; and the location of the sensor is selected from between a location in the interior of said layer of water absorbent sheet material, and at the downstream face thereof.

9. The method of claim 8, wherein:

the evaporative pad is wetted by spraying water upon the upstream face of the layer constructed of water absorbent sheet material.

10. The method of claim 8, wherein the evaporative pad further comprises:

a layer of air permeable mesh of heat conducting members abutting the downstream face of the water absorbent sheet layer and itself having a downstream face, said mesh members being conductively connected to a multiplicity of heat conducting members extending upstream through the water absorbent sheet layer.

11. The method claim 10, wherein:

the evaporative pad is wetted by spraying water upon the upstream face of the layer constructed of water absorbent sheet material.

12. The method of claim 10, wherein the evaporative pad further comprises:

an upstream layer abutting the upstream face of the layer constructed of water absorbent sheet material, the upstream layer having an upstream face and being constructed of a single sheet of water impervious, heat conducting sheet material having air passages defined by baffles of said material upon which water droplets in the stream impinge; wherein the multiplicity of heat conducting members from the mesh layer extend through and are conductively connected to said upstream layer.

13. The method of claim 12, wherein:

the evaporative pad is wetted by spraying water upon the upstream face of the layer constructed of water impervious sheet material.

14. The method of claim 13, wherein:

the evaporation pad is supported by a metallic wire mesh, so that said pad may be used with air stream velocities at least equal to that of sling psychrometrics.

15. The method of claim 8, wherein:

the evaporation pad is supported by a metallic wire mesh, so that said pad may be used with air stream velocities at least equal to that of sling psychrometers.

16. A method of evaporatively conditioning a moving stream of air having velocities at least equal to that of a sling psychrometer when used to determine the dew point, to modulate the moisture content thereof to achieve target values of moisture content and temperature within said stream, comprising the steps:

embedding at least one sensor to be surrounded by an evaporation pad through which the air stream is moving, the output of said sensor being predictably related to the moisture content of the air as it moves through the evaporation pad;

continuously monitoring the sensor output;

continuously analyzing the monitored output to determine whether and at what rate to add water to the air stream entering the pad, to urge the moisture content to a target value selected from between a target value which is less than 100% relative humidity without dripping of water out of the pad, and a target value which is at or beyond the condensation point with minimal dripping of water out of the pad;

introducing water into the stream entering the pad in accordance with the continuing analyses.

17. The method of claim 16, wherein:

the sensor output is related to relative humidity in the range to 100% in the air in the pad; and to condensation level of the air in the pad in a range of air moisture content greater than 100% relative humidity.

18. The method of claim 17, wherein:

the outputs indicating relative humidity and condensation level of the air in the pad are both provided by a single sensing element within a single sensor assembly.

* * * * *